F. R. SUNDERMAN.
INTERNAL COMBUSTION ENGINE.
APPLICATION FILED SEPT. 12, 1917.
1,271,799.
Patented July 9, 1918.
2 SHEETS—SHEET 1.
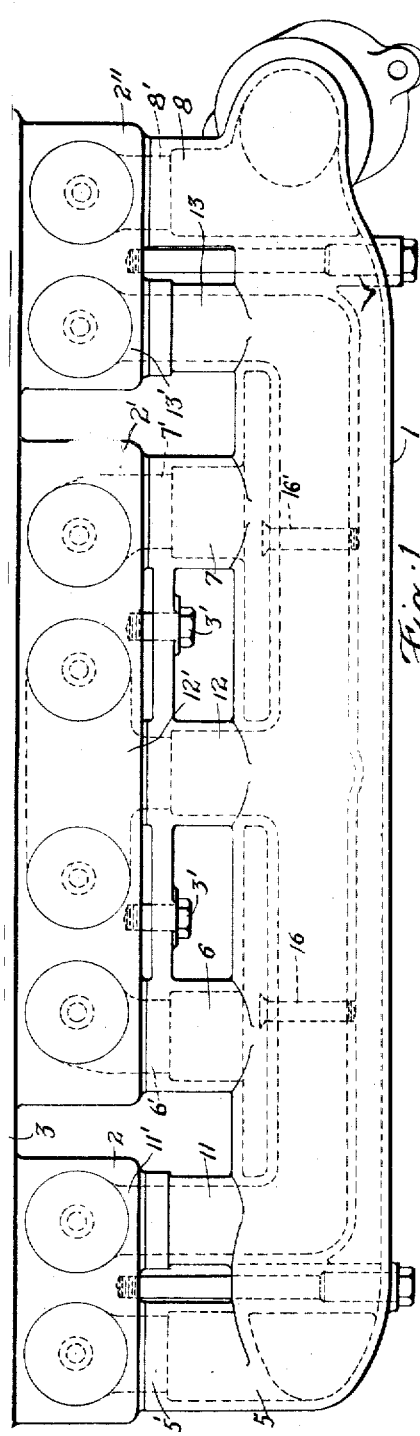
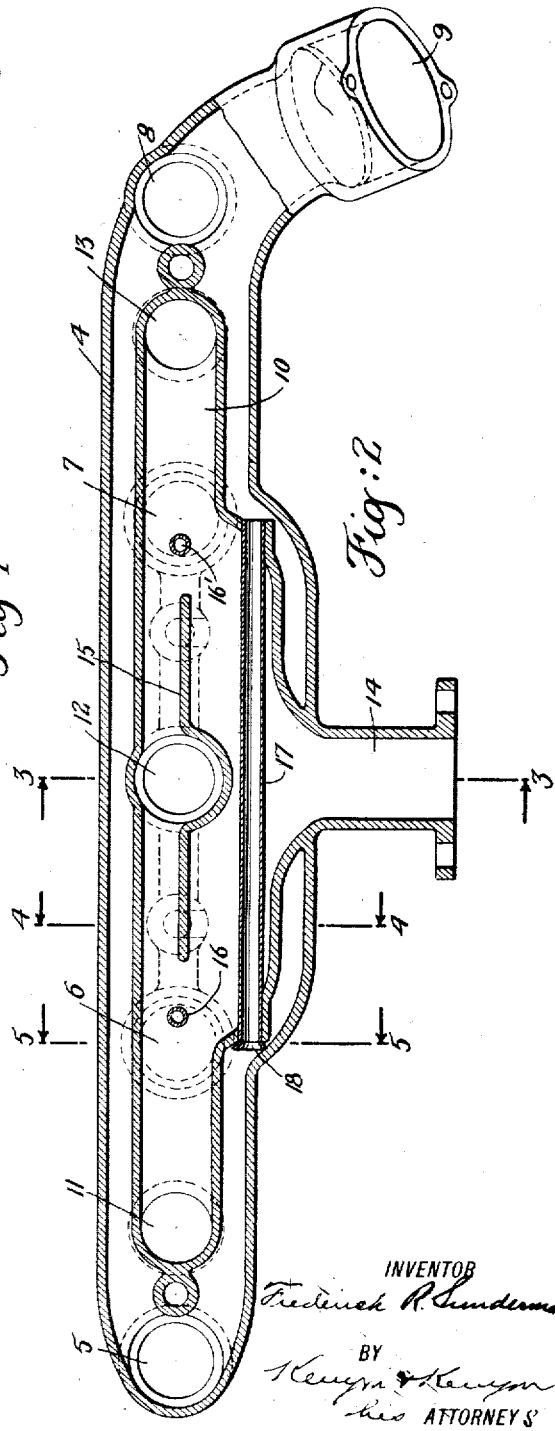
INVENTOR
Frederick R. Sunderman
BY
Kenyon & Kenyon
his ATTORNEYS

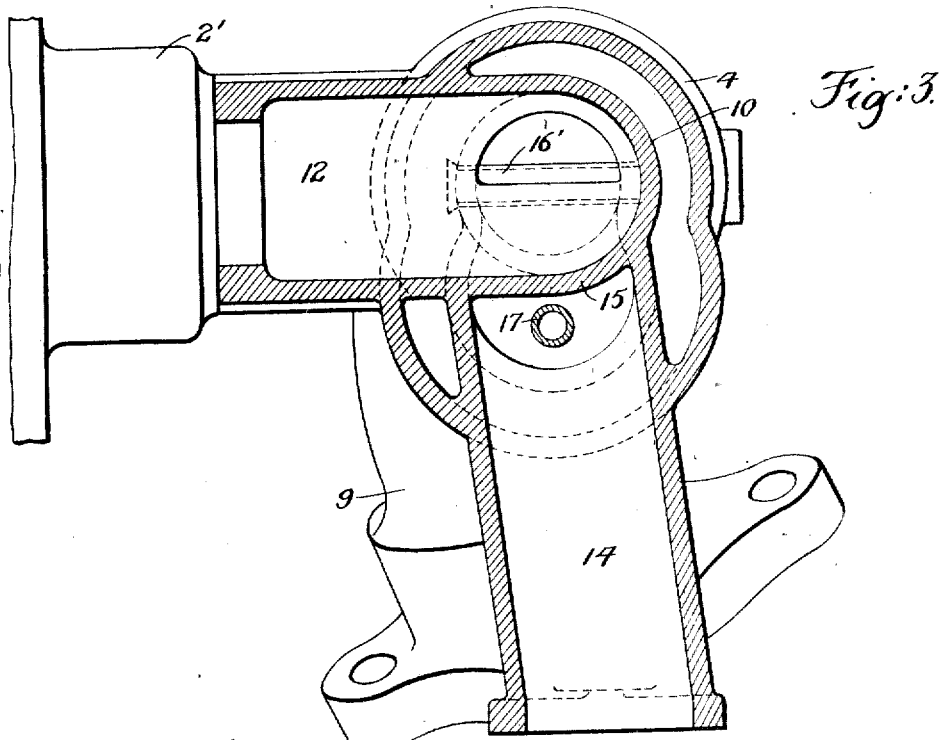
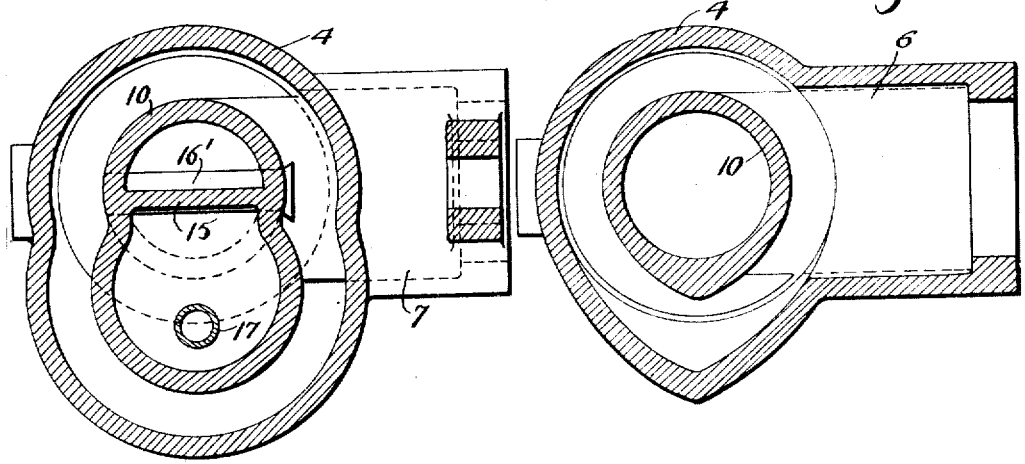

UNITED STATES PATENT OFFICE.

FREDERICK R. SUNDERMAN, OF DETROIT, MICHIGAN, ASSIGNOR TO SUNDERMAN CORPORATION, OF NEWBURGH, NEW YORK, A CORPORATION OF NEW YORK.

INTERNAL-COMBUSTION ENGINE.

1,271,799.   Specification of Letters Patent.   Patented July 9, 1918.

Application filed September 12, 1917. Serial No. 190,922.

*To all whom it may concern:*

Be it known that I, FREDERICK R. SUNDERMAN, a citizen of the United States, and a resident of Detroit, Wayne county, Michigan, have invented certain new and useful Improvements in Internal-Combustion Engines, of which the following is a specification.

My invention relates to internal combustion engines, and more particularly to a combined exhaust and intake manifold for such engines.

The principal object of the invention is to insure such thorough heating of the fuel mixture just before it enters the cylinders that the lower grades of gasolene, and even the heavier distillate known as kerosene, can be readily and efficiently utilized as fuel for internal combustion engines.

Another object of the invention is to provide a durable and efficient manifold of the character mentioned.

It has been proposed to heat the fuel mixture of internal combustion engines by utilizing manifold constructions in which the intake manifold is formed within the exhaust manifold, but only the outer strata of the intake mixture going through the inner manifold is properly heated, the flow of intake mixture being too rapid to permit the inner portion of the current or currents of the fuel mixture to be heated, and in these constructions the intake manifold has not been arranged so as to permit a uniform and efficient heating of its walls by the exhaust gases flowing through the outer manifold. Other fuel heating apparatus of various constructions have also been proposed, but they do not provide for the proper heating of the fuel mixture just before it enters the cylinders, so as to insure its passing into the cylinders in its heated condition to prevent partial precipitation before reaching the cylinders.

My invention consists in the novel features hereinafter described in their preferred form and more particularly pointed out in the appended claims; and further objects and advantages of the invention will more fully appear from the following description taken in connection with the accompanying drawings showing the preferred form of the invention, and in which—

Figure 1 shows a top plan view of a part of a four-cylinder engine equipped with a manifold embodying my invention;

Fig. 2 shows a vertical longitudinal section of said manifold;

Fig. 3 shows an enlarged transverse section taken on line 3—3 of Fig. 2, looking in the direction of the arrow;

Fig. 4 shows an enlarged transverse section taken on line 4—4 of Fig. 2, looking in the direction of the arrow; and Fig. 5 shows an enlarged transverse section taken on line 5—5 of Fig. 2, looking in the direction of the arrow.

Referring to the drawings, 1 is the combined intake and exhaust manifold extending transversely of and lying in juxtaposition to the valve casings 2, 2' and 2'' of the cylinders. These valve casings may be cast integrally with the cylinder casing 3 or separately, and secured thereto, as is well understood.

The manifold is secured to the engine in any suitable manner, such as by bolts 3'. The manifold comprises an outer shell or casing 4 having lateral intake exhaust extensions or openings 5, 6, 7, 8, which extend horizontally from the manifold and are adapted to fit up against and in register with passages 5', 6', 7', 8' for conveying exhaust gases from the cylinders, so that the exhaust gases are discharged directly from the cylinders and their exhaust passages into the exhaust manifold. This outer or exhaust manifold has an exhaust opening 9 adapted to couple up to any suitable pipe usually leading through a muffler.

The intake chamber or manifold is formed by an inner shell 10 cast integrally with the outer shell 4, and it is preferably of the same general contour as the outer shell and sufficiently smaller in size to provide the desired space between the inner and outer walls for the flow of exhaust gases. The two shells, as shown in the cross-sectional views, are in general symmetrically arranged one within the other so as to provide a passage substantially completely surrounding the inner shell except for the necessary intake and outlet openings and supporting means. This passage, as shown in the drawings, is preferably uniform in cross section, so as to produce as near as possible a uniform flow of the gases around and along the inner shell to heat the same. The inner or intake manifold is also provided with a plurality of horizontal lateral projections or openings 11, 12, 13, which are adapted to register with fuel intake passages 11′, 12′, 13′ formed in the cylinder casing or valve chamber thereof and leading to the cylinders. Two of these openings 11 and 13 are arranged at the extremity of the intake manifold, while the other opening is arranged centrally of the intake manifold and conveys the intake mixture to the two adjacent middle cylinders. The inner manifold is also provided with an intake passage 14 in the form of an integral lower extension to the manifold at the base of which the inner and outer manifold shells join. This intake passage is preferably arranged substantially centrally of the length of the intake manifold, and when so constructed, to insure the proper distribution of the fuel mixture to the various cylinders, the nearest opening 12 to the cylinders has arranged below it a partition or web 15 extending across the inner manifold beneath said opening 12 and a sufficient distance in each direction therefrom to insure substantially even distribution of the fuel to the various openings or passages 11, 12, 13.

This arrangement insures a very uniform heating of the inner shell, and in view of the fact that the inner shell is connected but at few points with the outer shell, and then only by connections of substantially small cross-sectional area, substantially all of the heat of the inner shell is utilized in heating the outer portion or strata of the intake mixture flowing through the inner manifold to the cylinders. Furthermore, the loss of heat from the outer shell by conduction to the engine frame is reduced by reason of the body of the manifold construction being slightly offset from the engine body, by slightly extending the lateral passages 5 to 8 and 11 to 13 so as to provide a small air space between the cylinder casings and the main body of the manifold, thus the loss of heat by direct conduction through the metal of the manifold is lost only through the lateral extensions. While this construction of the manifolds shows a very uniform and satisfactory degree of heating of the inner shell, and hence of the outer strata or portion of the fuel mixture, the heating of the inner shell is not sufficient to properly heat the rapidly flowing current of fuel mixture to the cylinders because the mixture does not remain within the manifold a sufficient length of time to permit by this arrangement the heating of the inner portions of the mixture. In order to sufficiently heat this portion of the mixture to permit the efficient and ready burning of heavier hydrocarbon fuel such as kerosene, I have found it necessary to provide flue-like passages extending through the intake manifold in such manner as to conduct the exhaust gases through the intake manifold. I have found it desirable to utilize comparatively few of these heating flues so as not to interfere with the smooth and steady flow of the fuel mixture to the cylinders, and I have found that in order to heat to the desired extent the fuel mixture, it is important to place at least some of these flues so that they will receive the exhaust direct from the cylinders. In other words, so as to get the direct blast of the exhaust as it comes from the cylinder or valve casing so as to utilize the exhaust when it is as hot as possible and while flowing at high velocity, thus insuring a steady rapid stream of hot exhaust gas through the inner manifold.

I have also found it desirable, in order to keep these flues as hot as possible, to make them of comparatively short length, and for this purpose, I have arranged them transversely of the intake manifold. In the present embodiment of the invention I have illustrated two of these transverse flues or passages 16, 16′, and they are shown with their mouths or intake ends expanded and lying in alinement with or opposite the lateral exhaust openings 6, 7, so as to receive the exhaust blast directly from the valve casing of the cylinder. The expanded mouth of the flues insures a more rapid flow of the gases therethrough.

In addition to these transverse flues arranged opposite the lateral passages communicating with the cylinders, I provide an exhaust flue 17 extending longitudinally of the intake manifold and just above the intake passage to said manifold, so that this heated tube is engaged by the fuel mixture as it flows from the carbureter into the manifold. This tube or flue likewise has an expanded intake end 18.

The two short transverse flues 16, 16′ form a tight fit with one wall of the intake manifold, and are threaded through the other wall, while the longitudinal flue 17 is laid in a mold and cast in the wall of the intake manifold.

With this construction, the rapidly flowing fuel mixture is well heated throughout and to such an extent that the heavier hydrocarbon fuels such as kerosene, have been very satisfactorily utilized.

The thorough mixture and vaporization of kerosene by the use of the manifold herein shown and described, is so thorough that in careful tests the efficiency obtained while using kerosene with this manifold was 22-1/4% more than the efficiency of the same engine utilizing gasolene; and in trips extending over five thousand miles, it was found that within twenty seconds after the engine was started up, kerosene could be satisfactorily utilized as the hydrocarbon fuel, and that the engine could be started on kerosene any time after it had warmed up and could be throttled down with as smooth operation and speeded up as rapidly and as satisfactorily as with the use of gasolene.

While I have described in detail the preferred form of my invention, it will be obvious to those skilled in the art, after understanding my invention, that various modifications may be made therein without departing from the spirit or scope of my invention.

Having thus described my invention, what I claim as new and desire to secure by Letters Patent, is:—

1. In an internal combustion engine, the combination with the cylinders having intake and exhaust passages, of an exhaust manifold extending across the cylinders in juxtaposition thereto and having a plurality of lateral inlet openings registering with said exhaust passages to receive the exhaust gas therefrom and having an outlet opening, an intake manifold extending longitudinally of and within said exhaust manifold so as to have its walls heated by the exhaust gases, and having an intake opening for fuel mixture, and lateral outlet openings registering with the intake passages of the cylinders, and one or more exhaust flues entering the intake manifold at points near the exhaust passages of the cylinders and extending through said intake manifold so as to cause the hot gases direct from the cylinders to rapidly pass through the flues, whereby the intake manifold is heated externally and internally in such manner as to thoroughly heat the fuel mixture just before it enters the cylinders.

2. In an internal combustion engine, the combination with cylinders having intake and exhaust passages, of an exhaust manifold extending across the cylinders in juxaposition thereto and having a plurality of lateral inlet openings registering with said exhaust passages to receive the exhaust gas therefrom and having an outlet opening, an intake manifold cast integrally with the exhaust manifold and within the same and having an inlet opening from which said manifold branches in opposite directions longitudinally of the exhaust manifold and is provided with lateral openings extending through the wall of the exhaust manifold and registering with the intake openings of the cylinder, and exhaust flues extending through the intake manifold and having their intake ends in position to receive the direct discharge of the exhaust from the cylinders, whereby the walls of the intake manifold are heated by the exhaust gases and the interior of said intake manifold heated by the passage therethrough of hot exhaust gases directly from the cylinders so as to thoroughly heat the intake mixture just before it enters the cylinders.

3. In a manifold construction for internal combustion engines, the combination of an exhaust manifold adapted to extend across the cylinders of the engine in juxtaposition thereto and having a plurality of lateral spaced openings for receiving the exhaust directly from said cylinders, an intake manifold cast integrally with and within the exhaust manifold and extending longitudinally thereof and having an inlet opening intermediate its length for fuel mixture and a plurality of spaced lateral outlet openings through which fuel is fed to the cylinders, a plurality of exhaust flues extending transversely through the intake manifold commencing opposite the said spaced openings from the exhaust manifold to the cylinders so as to convey the hot exhaust gas directly from said openings through the intake manifold to heat the same, and an exhaust flue extending longitudinally through the intake manifold above the intake opening of said manifold to also heat the fuel mixture, whereby the walls of the intake manifold are heated by the exhaust gases and the interior of said manifold heated by the hot exhaust gases directly from the cylinders so as to insure the proper heating of the intake mixture just before it enters the cylinders.

4. In a manifold construction for internal combustion engines, the combination of an outer manifold casing having a discharge opening at one end and a plurality of lateral exhaust intake openings along the length thereof adapted to register with the exhaust passages of the engine, an inner manifold casing cast integrally with and lying within said outer casing with a space between said casings for the flow of exhaust gases surrounding said inner casing on all sides so as to bring all of the walls thereof directly in contact with the hot exhaust gases and reduce heat conduction from said walls, said inner casing extending longitudinally of the outer casing and having a plurality of lateral openings along its length adapted to register with the engine fuel intake openings and having a lateral intake passage extending through the wall of the outer casing for receiving fuel mixture from a carbureter, a plurality of short transverse flues entering the inner manifold casing at points substantially in line with the lateral intake openings of the outer casing and extending through said inner casing so as to convey hot exhaust gases through the inner casing directly as they are discharged from the cylinders, and an exhaust flue extending longitudinally through said inner casing above the intake opening thereof, whereby the wall of the inner casing is substantially uniformly heated by the flow of the hot exhaust gases through the outer casing and the inner portions of the intake mixture flowing through the inner casing are heated by the exhaust flues extending through the inner casing, to insure the proper heating of the intake mixture just before it enters the cylinders.

5. In an internal combustion engine, the combination with the cylinders having intake and exhaust passages, of an exhaust manifold extending across the cylinders in juxtaposition thereto and having a plurality of lateral inlet openings registering with said exhaust passages to receive the exhaust gas therefrom and having an outlet opening at one end thereof, an intake manifold extending longitudinally of and within said exhaust manifold so as to provide a space between the two for the free flow of exhaust gases longitudinally of the exhaust manifold from the said inlet openings to the outlet opening, said intake manifold having an intake opening for fuel mixture and lateral outlet openings registering with the intake passages of the cylinders, and one or more exhaust flues extending through the intake manifold for conducting hot exhaust gases therethrough, whereby the intake manifold is heated externally and internally in such manner as to thoroughly heat the fuel mixture just before it enters the cylinders.

6. In a manifold construction for internal combustion engines, the combination of an outer manifold casing having a discharge opening at one end and a plurality of lateral exhaust intake openings along the length thereof adapted to register with the exhaust passages of the engine, an inner manifold casing cast integrally with and lying within said outer casing with a space between said casings for the free flow of exhaust gases longitudinally of the manifold and surrounding said inner casing on all sides so as to bring the walls thereof directly in contact with the hot exhaust gases, said inner casing extending longitudinally of the outer casing and having a plurality of lateral openings along its length adapted to register with the engine fuel intake openings and having a lateral intake passage extending through the wall of the outer casing for receiving fuel mixture from a carbureter, a plurality of exhaust flues extending through the inner casing to convey exhaust gases through the same for heating the interior thereof, whereby the inner and outer portions of the fuel mixture flowing through the inner casing are heated in passing to the engine and just before entering the cylinders.

7. In a manifold construction for internal combustion engines, the combination of an exhaust manifold adapted to extend across the cylinders of the engine in juxtaposition thereto and having a plurality of lateral spaced openings for receiving the exhaust directly from said cylinders, an intake manifold within the exhaust manifold and extending longitudinally thereof and having an inlet opening intermediate its length for fuel mixture and a plurality of spaced lateral outlet openings through which fuel is fed to the cylinders, a plurality of exhaust flues extending transversely through the intake manifold commencing opposite the said spaced openings from the exhaust manifold to the cylinders so as to convey the hot exhaust gas directly from said openings through the intake manifold to heat the same, whereby the walls of the intake manifold are heated by the exhaust gases and the interior of said manifold heated by the hot exhaust gases directly from the cylinders so as to insure the proper heating of the intake mixture just before it enters the cylinders.

In testimony whereof, I have signed my name to this specification.

FREDERICK R. SUNDERMAN.